(12) United States Patent
Fujiwara et al.

(10) Patent No.: US 11,415,948 B2
(45) Date of Patent: Aug. 16, 2022

(54) DEVICE FOR CONTROLLING ELECTRIC MOTOR

(71) Applicant: Panasonic Intellectual Property Management Co., Ltd., Osaka (JP)

(72) Inventors: Hiroshi Fujiwara, Osaka (JP); Toru Tazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 226 days.

(21) Appl. No.: 16/912,774

(22) Filed: Jun. 26, 2020

(65) Prior Publication Data

US 2020/0326665 A1    Oct. 15, 2020

Related U.S. Application Data

(63) Continuation of application No. PCT/JP2018/046903, filed on Dec. 20, 2018.

(30) Foreign Application Priority Data

Jan. 9, 2018 (JP) .............................. JP2018-000988

(51) Int. Cl.
    *G05B 11/32*    (2006.01)
    *F16F 15/18*    (2006.01)
    (Continued)

(52) U.S. Cl.
    CPC .............. *G05B 11/32* (2013.01); *F16F 15/18* (2013.01); *G05B 11/36* (2013.01); *G05D 3/12* (2013.01);
    (Continued)

(58) Field of Classification Search
    CPC .......... G05B 11/32; G05B 11/36; H02K 5/24; H02P 6/16; H02P 29/00; H02P 6/34; H02P 23/20
    (Continued)

(56) References Cited

U.S. PATENT DOCUMENTS 5,936,792 A    8/1999 Kobayashi et al.
9,419,553 B2 *  8/2016 Nakai ..................... H02P 21/05
(Continued)

FOREIGN PATENT DOCUMENTS

| EP | 1496412 A1 | 1/2005 |
|----|------------|--------|
| JP | 6-091482   | 4/1994 |
| WO | 2015/136696 A1 | 9/2015 |

OTHER PUBLICATIONS

The Extended European Search Report dated Dec. 18, 2020 for the related European Patent Application No. 18899132.7.
(Continued)

*Primary Examiner* — David Luo
(74) *Attorney, Agent, or Firm* — McDermott Will & Emery LLP (57) ABSTRACT

An electric motor control device includes a feedforward controller, a feedback controller, and an adder-subtractor. The feedforward controller receives a position command signal to specify a target position of a control target load and outputs signals representing a target position, target speed and torque of the electric motor. The feedback controller outputs a feedback torque command signal representing a torque command to perform feedback control in such a manner that an electric motor position signal and a feedforward position command signal coincide with each other. The adder-subtractor subtracts a load acceleration feedback torque signal obtained by multiplying a load acceleration signal representing acceleration of the control target load by a load acceleration feedback gain from a torque command
(Continued)

signal obtained by adding a feedforward torque command signal and the feedback torque command signal, and outputs a result of the subtraction as a torque command correction signal.

3 Claims, 4 Drawing Sheets

(51) Int. Cl.
    *G05B 11/36*     (2006.01)
    *G05D 3/12*     (2006.01)
    *H02K 5/24*     (2006.01)
    *H02P 6/16*     (2016.01)
    *H02P 29/00*     (2016.01)

(52) U.S. Cl.
    CPC ............... *H02K 5/24* (2013.01); *H02P 6/16* (2013.01); *H02P 29/00* (2013.01)

(58) Field of Classification Search
    USPC ..................................... 318/560, 561; 700/1
    See application file for complete search history.

(56) References Cited

U.S. PATENT DOCUMENTS

| | | | |
|---|---|---|---|
| 9,479,106 B2 * | 10/2016 | Nakai | ............... H02P 21/50 |
| 2002/0054450 A1 | 5/2002 | Chu et al. | |
| 2017/0083007 A1 | 3/2017 | Oda | |

OTHER PUBLICATIONS

R.D. Lorenz : "Robotics and Automation Applications of Drives and Converters", Proceedings of the IEEE., vol. 89, No. 6, Jun. 2, 2001 (Jun. 2, 2001), pp. 951-962, XP055756963.

International Search Report of PCT application No. PCT/JP2018/046903 dated Apr. 2, 2019.

Communication pursuant to Article 94(3) EPC dated Jul. 4, 2022 for the related European Patent Application No. 18899132.7.

* cited by examiner

DEVICE FOR CONTROLLING ELECTRIC MOTOR

BACKGROUND

1. Technical Field

The present invention relates to an electric motor control device that controls, with respect to a mechanical load driven by the electric motor, a driving operation of the electric motor with respect to a speed, a position, or the like. In particular, the present invention relates to an electric motor control device including a control configuration for suppressing vibration caused by antiresonance of a mechanical load when the mechanical load is being driven.

2. Description of the Related Art

This type of electric motor control device internally has at least one of a feedforward control system and a feedback control system so that a position command having been input from a high-level controller can coincide with positions of the electric motor and a control target load (in other words, a mechanical load). Such an electric motor control device controls the positions of the electric motor and the control target load (mechanical load) as follows. The electric motor control device calculates, from the position command and a detection value of a position of the electric motor, a torque command value for making the position command coincide with the position of the electric motor, and the electric motor control device controls a current supplied to a stator winding wire of the electric motor in such a manner that the electric motor can generate the same torque as that of a torque command value. However, if a mechanical rigidity of a joint part between the electric motor and the control target load (mechanical load) is low, vibration tends to occur due to antiresonance on the control target load (mechanical load) at a time of acceleration or deceleration or when external disturbance is applied. Therefore, it is considered as an object to further improve settling property and external disturbance suppression performance compared to the conventional level.

To address this object, a conventional feed control device is configured as follows to suppress the vibration occurring on a control target load (mechanical load) at the time of acceleration or deceleration or when an external disturbance is applied. An acceleration sensor is provided on a slider that is the control target load (mechanical load), and an acceleration feedback loop is provided in which a detected acceleration value of the control target load (mechanical load) is multiplied by an acceleration feedback gain functioning as a weighting coefficient and in which a result of the multiplication is subtracted from the torque command value (for example, see Unexamined Japanese Patent Publication No. 116-91482).

In a configuration represented in Unexamined Japanese Patent Publication No. 116-91482 or the like, as the acceleration feedback gain is set larger, vibration depending on the mechanical rigidity becomes smaller. On the other hand, when this configuration is applied to an electric motor control device having a feedforward control system, a torque necessary to accelerate or decelerate the load is subtracted from the torque command value. Therefore, there is a problem that command follow-up performance is deteriorated, thereby causing operation delay, overshoot, undershoot, or the like just before stopping and that it is impossible to satisfy both of settling property and vibration suppression. In other word, there is a trade-off relation between an acceleration feedback gain (acceleration feedback amount) and command follow-up performance, and more improvement is demanded to satisfy both of settling property and vibration suppression.

SUMMARY

A first aspect for solving the object is directed to an electric motor control device that drives a control target load (mechanical load), the electric motor control device including a feedforward controller, a feedback controller, and an adder-subtractor.

The feedforward controller receives a position command signal to specify a target position of the control target load and outputs a feedforward position command signal representing a target position of the electric motor, a feedforward speed command signal representing a target speed of the electric motor, and a feedforward torque command signal representing a torque necessary for the electric motor to perform an operation indicated by the target position or the target speed.

The feedback controller receives the feedforward position command signal, the feedforward speed command signal, an electric motor position signal representing a position of the electric motor, an electric motor speed signal representing a speed of the electric motor, and outputs a feedback torque command signal representing a torque command to perform feedback control in such a manner that the electric motor position signal and the feedforward position command signal coincide with each other.

The adder-subtractor subtracts a load acceleration feedback torque signal obtained by multiplying a load acceleration signal representing acceleration of the control target load by a load acceleration feedback gain from a torque command signal obtained by adding the feedforward torque command signal and the feedback torque command signal, and outputs a result of the subtraction as a torque command correction signal.

The feedforward controller generates the feedforward torque command signal so as to previously compensate an effect of the load acceleration feedback torque signal that is subtracted from the torque command signal at a time of an acceleration-deceleration operation.

DETAILED DESCRIPTION

The present invention solves a conventional object. An object of the present invention is to provide an electric motor control device in which both of settling property and vibration suppression can be satisfied in the electric motor control device having a feedforward control system and a load acceleration feedback system, by obtaining a vibration suppression effect due to the load acceleration feedback while maintaining command follow-up performance. That is, by relaxing or removing a trade-off relation between a load acceleration feedback gain (acceleration feedback amount) and command follow-up performance, the present invention provides an electric motor control device in which a vibration suppression effect is enhanced by acceleration feedback from a load side and, at the same time, the command follow-up performance is maintained.

In order to solve the above object, the inventors of the present application have earnestly studied, making trials and errors. As a result, the inventors have conceived a novel electric motor control device in which the vibration suppression effect is enhanced by acceleration feedback from a load side and, at the same time, a command follow-up performance is maintained. The details will be described below.

A first aspect for solving the object is directed to an electric motor control device that drives a control target load (mechanical load), the electric motor control device including a feedforward controller, a feedback controller, and an adder-subtractor.

The feedforward controller receives a position command signal to specify a target position of the control target load and outputs a feedforward position command signal representing a target position of the electric motor, a feedforward speed command signal representing a target speed of the electric motor, and a feedforward torque command signal representing a torque necessary for the electric motor to perform an operation indicated by the target position or the target speed.

The feedback controller receives the feedforward position command signal, the feedforward speed command signal, an electric motor position signal representing a position of the electric motor, an electric motor speed signal representing a speed of the electric motor, and outputs a feedback torque command signal representing a torque command to perform feedback control in such a manner that the electric motor position signal and the feedforward position command signal coincide with each other.

The adder-subtractor subtracts a load acceleration feedback torque signal obtained by multiplying a load acceleration signal representing acceleration of the control target load by a load acceleration feedback gain from a torque command signal obtained by adding the feedforward torque command signal and the feedback torque command signal, and outputs a result of the subtraction as a torque command correction signal.

The feedforward controller generates the feedforward torque command signal so as to previously compensate an effect of the load acceleration feedback torque signal that is subtracted from the torque command signal at a time of an acceleration-deceleration operation.

Further, in a second aspect, the feedforward controller generates, in the electric motor control device of the first aspect, the feedforward torque command signal by multiplying a feedforward acceleration command signal calculated by second-order differentiating the feedforward position command signal by an additional value of inertia of the electric motor, inertia of the control target load, and the load acceleration feedback gain.

Further, in a third aspect, the adder-subtractor generates, in the electric motor control device of the first aspect, a torque command correction signal by subtracting from the torque command signal a load acceleration feedback torque signal obtained by multiplying a signal obtained by performing a filtering process on the load acceleration signal representing the acceleration of the control target load by the load acceleration feedback gain.

The feedforward controller generates the feedforward torque command signal by adding following two signals: a signal obtained by multiplying a feedforward acceleration command signal calculated by second-order differentiating the feedforward position command signal by an additional value of inertia of the electric motor and inertia of the control target load; and a signal obtained by multiplying a signal obtained by performing a filtering process equivalent to the filtering process on the feedforward acceleration command signal by the load acceleration feedback gain.

With the above object solved, the electric motor control device having the feedforward control system and the load acceleration feedback system can enhance the vibration suppression effect due to the load acceleration feedback while maintaining the command follow-up performance without lowering the command follow-up performance due to the load acceleration feedback. Therefore, it is possible to satisfy both of the settling property and the vibration suppression.

The electric motor control device of the present invention previously compensates, in the feedforward torque calculation by the feedforward control system, an amount of the acceleration-deceleration torque reduced by the load acceleration feedback. The electric motor control device of the present invention can enhance the vibration suppression effect due to the load acceleration feedback while maintaining the command follow-up performance, and has therefore a large industrial value.

In the following, exemplary embodiments of the present invention will be described with reference to the drawings. Note that the present invention is not limited to the exemplary embodiments.

First Exemplary Embodiment

Figure 1:
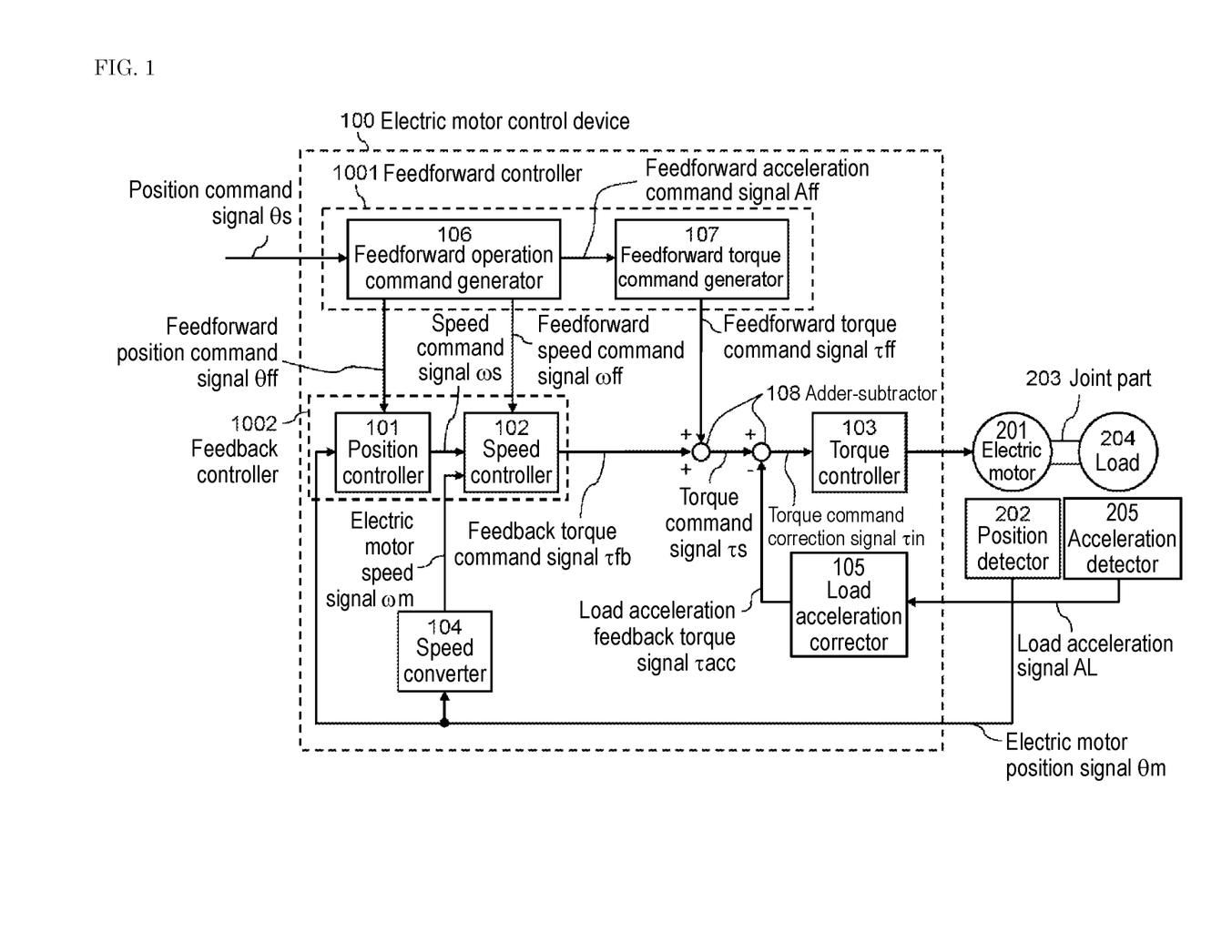
FIG. 1 is a diagram showing an example of a configuration of an electric motor control device in a first exemplary embodiment of the present invention.

FIG. 1 is a diagram showing an example of a configuration of an electric motor control device in a first exemplary embodiment of the present invention. Electric motor control device 100 shown in FIG. 1 is connected to electric motor 201, position detector 202 that detects a position of electric motor 201, and acceleration detector 205 that detects acceleration of load 204, which is a driving target and is connected to electric motor 201 via joint part 203. To electric motor control device 100, a position command signal is input from a high-level controller (not shown), and electric motor control device 100 controls a current supplied to a stator winding wire of the electric motor in such a manner that the position command signal coincides with positions of the electric motor and a control target load (a mechanical load). Position detector 202 detects the position of the electric motor and outputs the detected position as electric motor position signal θm to electric motor control device 100. Acceleration detector 205 detects acceleration of the load and outputs the detected acceleration to electric motor control device 100 as load acceleration signal AL.

A configuration of electric motor control device 100 will be described. Electric motor control device 100 internally has feedforward controller 1001, feedback controller 1002, torque controller 103, speed converter 104, load acceleration corrector 105, and adder-subtractor 108. Feedforward controller 1001 receives position command signal θs, and outputs feedforward position command signal θff representing a target operation of the electric motor, feedforward speed command signal ωff, and feedforward torque command signal τff, which is a torque necessary for the electric motor to perform the target operation.

Feedback controller 1002 receives feedforward position command signal θff, feedforward speed command signal ωff, electric motor position signal θm, and electric motor speed signal ωm calculated from electric motor position signal θm by speed converter 104, and outputs feedback torque command signal τfb representing a torque for reducing a positional difference between feedforward position command signal θff and electric motor position signal θm and a speed difference between feedforward speed command signal ωff and electric motor speed signal ωm.

Adder-subtractor 108 outputs torque command correction signal τin obtained by subtracting load acceleration feedback torque signal τacc to be described later from torque command signal τs that is an additional value of feedforward torque command signal τff and feedback torque command signal τfb. Torque controller 103 receives torque command correction signal τin and controls the current supplied to a stator winding wire of the electric motor in such a manner that the electric motor generates the same torque as that of torque command correction signal τin.

Load acceleration corrector 105 receives load acceleration correction signal AL obtained by subtracting command acceleration signal As from load acceleration signal AL and outputs load acceleration feedback torque signal τacc.

As described above, electric motor control device 100 internally has a feedforward control system and a cascade-type feedback control system in which the electric motor position, the electric motor speed, and the load speed are fed back in such a manner that the position command coincides with the positions of the electric motor and the load.

Next, a configuration of the electric motor control device will be described in detail.

Feedforward controller 1001 internally has feedforward operation command generator 106 and feedforward torque command generator 107.

Feedforward operation command generator 106 receives position command signal θs and outputs feedforward position command signal θff, feedforward speed command signal ωff, and feedforward acceleration command signal Aff. For example, feedforward operation command generator 106 outputs position command signal θs as is as feedforward position command signal θff. Feedforward operation command generator 106 calculates feedforward speed command signal ωff by performing a first-order differential operation on feedforward position command signal θff, and calculates feedforward acceleration command signal Aff by performing a second-order differential operation on feedforward position command signal θff.

Feedforward torque command generator 107 receives feedforward acceleration command signal Aff and outputs feedforward torque command signal τff, which is a torque necessary for the acceleration of electric motor 201 or load 204 to coincide with feedforward acceleration command signal Aff.

For example, feedforward torque command generator 107 calculates feedforward torque command τff by multiplying feedforward acceleration command Aff by a weighting coefficient representing total inertia of the electric motor, the load, or the like. Note that a configuration, in feedforward torque command generator 107, for calculating feedforward torque command signal τff will be described later in detail.

As described above, feedforward controller 1001 outputs feedforward position command signal θff, feedforward speed command signal ωff, and feedforward torque command signal τff on the basis of position command signal θs having been input, by the actions of feedforward operation command generator 106 and feedforward torque command generator 107. Feedback controller 1002 internally has position controller 101 and speed controller 102. Position controller 101 receives feedforward position command signal θff and electric motor position signal θm, and outputs speed command signal ωs for reducing the difference between feedforward position command signal θff and electric motor position signal θm. Position controller 101 performs, for example, a proportional control calculation in which a result of multiplying feedforward position command signal θff and electric motor position signal θm by a weighting coefficient is output as speed command signal ωs.

Speed controller 102 receives feedforward speed command signal ωff, speed command signal ωs, and electric motor speed signal ωm. Speed controller 102 outputs feedback torque command signal τfb for reducing the difference between electric motor speed signal ωm and an additional value of feedforward speed command signal ωff and speed command signal ωs. Speed controller 102 performs, for example, a proportional integral operation in which an additional value of the following two calculation results is output as feedback torque command signal τfb: (i) a result of multiplying by a weighting coefficient a result of subtracting electric motor speed signal ωm from an additional value of feedforward speed command signal ωff and speed command signal ωs, and (ii) a result of multiplying by a weighting coefficient an integral value of a result of subtracting electric motor speed signal ωm from an additional value of feedforward speed command signal ωff and speed command signal ωs.

As described above, feedback controller 1002 outputs feedback torque command signal τfb on the basis of the following signals having been input: feedforward position command signal θff; feedforward speed command signal ωff; electric motor position signal θm; and electric motor speed signal ωm.

Speed converter 104 receives electric motor position signal θm and outputs electric motor speed signal ωm representing an electric motor speed. Speed converter 104 performs, for example, a differential operation on electric motor position signal θm, and outputs the result of the differential operation as electric motor speed signal ωm.

Load acceleration corrector 105 receives load acceleration signal AL and outputs, as load acceleration feedback torque signal τacc, a value obtained by multiplying load acceleration signal AL by a weighting coefficient. Then, a value obtained by subtracting load acceleration feedback torque signal τacc from torque command signal τs, which is an additional value of feedforward torque command signal τff and feedback torque command signal τfb, is input to torque controller 103 as torque command correction signal Tin.

However, when the electric motor or the load is accelerated or decelerated to make electric motor position signal θm or load position θL follow position command signal θs, if load acceleration feedback torque signal τacc is subtracted from torque command signal τs, load acceleration feedback torque signal τacc is subtracted from feedforward torque command signal τff, which is calculated as the torque necessary for an acceleration-deceleration operation. An action when load acceleration feedback torque signal τacc is subtracted from feedforward torque command signal τff will be described together with a working principle of load acceleration corrector 105.

Figure 2:
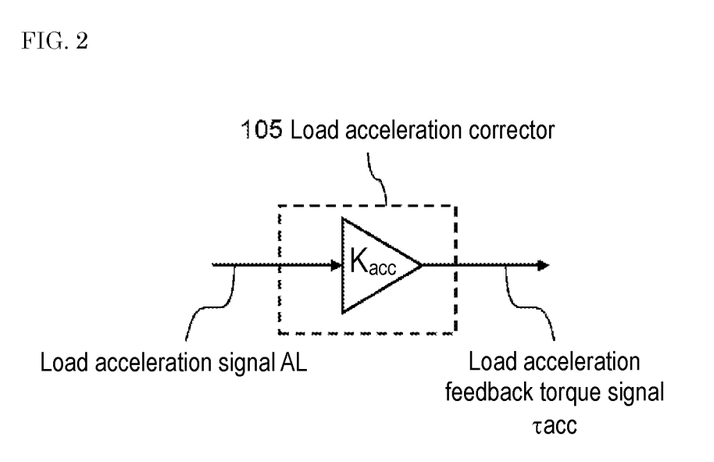
FIG. 2 is a diagram showing an example of a configuration of a load acceleration corrector in the first exemplary embodiment of the present invention.

FIG. 2 is a diagram showing an example of a configuration of load acceleration corrector 105 in the first exemplary embodiment of the present invention. Load acceleration corrector 105 receives load acceleration signal AL and outputs, as load acceleration feedback torque signal τacc, a value obtained by multiplying load acceleration signal AL by load acceleration feedback gain Kacc, which is a weighting coefficient. At this time, assuming that command acceleration signal As=0, a transfer function Gτs→θm(s) of electric motor position signal θm with respect to torque command signal τs and a transfer function Gτs→θL(s) of load position θL with respect to the torque command signal are respectively represented by following Equations (1) and (2).

$$G_{\tau s \to \theta m}(s) = \frac{1}{(J_m + J_L + K_{acc}) \cdot s^2} \cdot \frac{\frac{1}{\omega_z^2} \cdot s^2 + 1}{\frac{1}{\omega_p'^2} \cdot s^2 + 1} \quad (1)$$

$$G_{\tau s \to \theta L}(s) = \frac{1}{(J_m + J_L + K_{acc}) \cdot s^2} \cdot \frac{1}{\frac{1}{\omega_p'^2} \cdot s^2 + 1} \quad (2)$$

$$\omega_p' = \sqrt{\frac{J_m + J_L + K_{acc}}{J_m \cdot J_L} \cdot K_s} \quad (3)$$

$$\omega_z = \sqrt{\frac{K_s}{J_L}} \quad (4)$$

In Equations (1) and (2), s is a Laplace operator, Jm is inertia of electric motor 201, JL is inertia of load 204, ω'p is a resonance frequency in a transfer characteristic from torque command signal τs to electric motor position signal θm, and ωz is an antiresonance frequency in a transfer characteristic from torque command signal τs to electric motor position signal θm. The relation between electric motor inertia Jm, load inertia JL, and load acceleration feedback gain Kacc and resonance frequency ω'p is represented by Equation (3). The relation between electric motor inertia Jm, load inertia JL, and load acceleration feedback gain Kacc and antiresonance frequency ωz is represented by Equation (4). In Equations (3) and (4), Ks represent an elastic modulus of joint part 203. When load 204 is driven by electric motor control device 100 via electric motor 201, vibration at antiresonance frequency ωz is excited on load 204 by an acceleration-deceleration operation, and the vibration is a cause for deteriorating settling property at the time of stopping.

Equation (1) shows that when load acceleration feedback gain Kacc is increased, resonance frequency ω'p becomes larger, but antiresonance frequency ωz does not change. As the difference between the resonance frequency and the antiresonance frequency becomes larger, the gain at the antiresonance frequency becomes smaller, so that an effect of the antiresonance becomes smaller. On the other hand, Equations (1) and (2) show that the relation between electric motor position signal θm and load position θL with respect to torque command signal τs is the relation represented by the next Equation (5).

$$\frac{\theta_L(s)}{\theta_m(s)} = \frac{1}{\frac{1}{\omega_z^2} \cdot s^2 + 1} \quad (5)$$

Equation (5) shows that the relation between electric motor position signal θm and load position θL is constant regardless of load acceleration feedback gain Kacc. Therefore, when the gain of the transfer characteristic of electric motor position signal θm with respect to torque command signal τs at antiresonance frequency ωz becomes smaller due to load acceleration feedback gain Kacc being increased in Equation (1), the gain of the transfer characteristic of load position θL with respect to torque command signal τs at antiresonance frequency ωz becomes accordingly smaller. As a result, the vibration of load 204 at antiresonance frequency ωz caused by an acceleration-deceleration operation also becomes smaller.

Therefore, with the load acceleration being fed back by load acceleration corrector 105, the gain, in other words, the sensitivity at the antiresonance frequency is reduced by the above principle. As a result, when electric motor control device 100 is used to drive electric motor 201 or load 204, it is possible to reduce the antiresonant vibration caused on load 204 at the time of an acceleration-deceleration operation or when external disturbance is applied.

As described above, by causing load acceleration corrector 105 to feed back load acceleration signal AL, it is possible to obtain an effect of suppressing the vibration due to the antiresonance.

On the other hand, with reference to Equations (1) and (2), it is understood from the transfer functions of electric motor position signal θm and load position θL with respect to torque command signal τs that the total inertia is an additional value of electric motor inertia Jm, load inertia JL, and load acceleration feedback gain Kacc. That is, it is shown that due to the load acceleration feedback being performed by load acceleration corrector 105, the total inertia of the control target constituted by electric motor 201 and load 204 with respect to torque command signal τs is increased by an amount of load acceleration feedback gain Kacc.

This means that a subtraction of load acceleration feedback torque command τacc from torque command signal τs is equivalent to an increase in the total inertia of the control target with respect to torque command signal τs by an amount of load acceleration feedback gain Kacc.

In a case where the change in the total inertia due to the acceleration feedback of the control target load with respect to torque command signal τs is not considered in feedforward torque command generator 107, even if only feedforward torque command signal τff is applied to the electric motor at the time of an acceleration-deceleration operation, the operation command having been output from the feedforward operation command generator and the operation of the electric motor do not coincide with each other. That is, the command follow-up performance of the feedforward control is deteriorated.

Although the difference between the operation command and the operation of the electric motor is compensated by position controller 101 and speed controller 102 so that the operation command and the operation of the electric motor can coincide with each other, position controller 101 and speed controller 102 perform control depending on the deviation between the operation command and the operation of the electric motor stemming from non-coincidence between the operation command and the operation of the electric motor. Accordingly, the control has a delay, and the delay causes operation delay, overshoot, undershoot, or the like just before stopping.

That is, as the load acceleration feedback gain is increased in the electric motor control device having the feedforward control system and the load acceleration feedback system, the command follow-up performance becomes deteriorated, thereby causing operation delay, overshoot, undershoot, or the like just before stopping. In other word, there is a trade-off relation between an acceleration feedback gain (acceleration feedback amount) and command follow-up performance, and there is a problem that both of settling property and vibration suppression cannot be satisfied.

To prevent operation delay, overshoot, or undershoot just before stopping and to satisfy both of the settling property and the vibration suppression, load acceleration feedback torque signal τacc, which is an amount of reduction from torque command signal τs by the load acceleration feedback, needs to be considered in the calculation of feedforward torque command signal τff by feedforward torque command generator 107. In other words, it is necessary to consider the change in the total inertia of the control target with respect to torque command signal τs caused by the load acceleration feedback.

Figure 3:
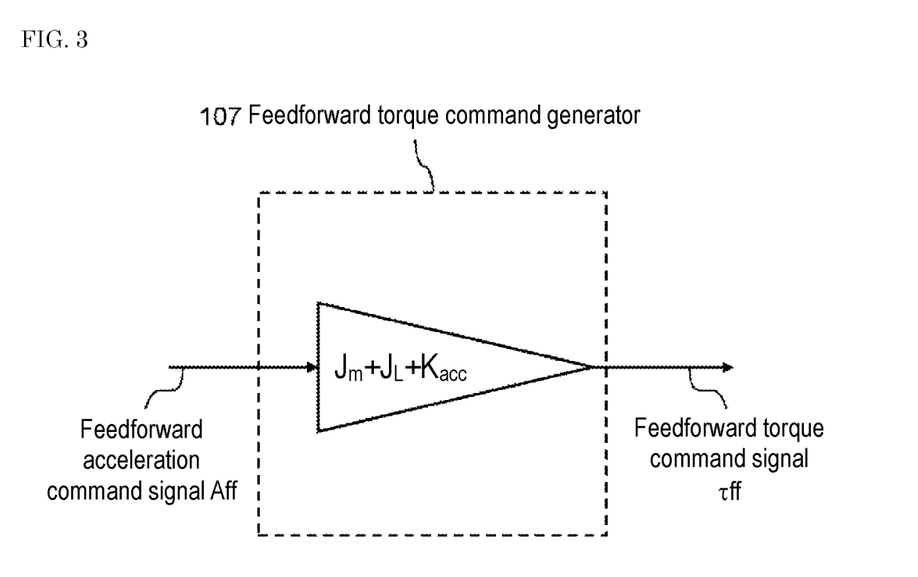
FIG. 3 is a diagram showing an example of a configuration of a feedforward torque command generator in the first exemplary embodiment of the present invention.

FIG. 3 is a diagram showing an example of a configuration of feedforward torque command generator 107 in the first exemplary embodiment of the present invention. Feedforward torque command generator 107 multiplies input feedforward acceleration command Aff by an additional value of electric motor inertia Jm, load inertia JL, load acceleration feedback gain Kacc to calculate the feedforward torque command signal.

As described above, in electric motor control device 100, when feedforward torque command generator 107 calculates feedforward torque command τff from feedforward acceleration command signal Aff, load acceleration feedback gain Kacc is considered in addition to the inertias of the electric motor and the load, so that feedforward torque command τff is calculated, taking into consideration of an effect caused by the change, due to the load acceleration feedback, in the total inertia of the control target with respect to torque command τs. This arrangement reduces the difference between the operation command and the operation of the electric motor at the time of an acceleration-deceleration operation, thereby improving the command follow-up performance, and operation delay, overshoot, undershoot, or the like just before stopping can therefore be improved.

As described above, in the present exemplary embodiment, since an amount of reduction in the acceleration-deceleration torque due to the load acceleration feedback is previously compensated in the feedforward torque calculation by the feedforward control system, it is possible to enhance the vibration suppression effect due to the load acceleration feedback while maintaining the command follow-up performance. As a result, the vibration suppression effect is achieved due to the load acceleration feedback, and, at the same time, the command follow-up performance is maintained; therefore, both of the settling property and the vibration suppression can be satisfied.

As described above, electric motor control device 100 of the present exemplary embodiment is an electric motor control device that drives a control target load, and includes feedforward controller 1001, feedback controller 1002, and adder-subtractor 108. Feedforward controller 1001 receives position command signal θs to specify a target position of the control target load and outputs feedforward position command signal θff representing a target position of the electric motor, feedforward speed command signal ωff representing a target speed of the electric motor, and feedforward torque command signal τff representing a torque necessary for the electric motor to perform an operation indicated by the target position or the target speed. Feedback controller 1002 receives feedforward position command signal θff, feedforward speed command signal ωff, electric motor position signal θm representing a position of the electric motor, electric motor speed signal ωm representing a speed of the electric motor, and outputs feedback torque command signal τfb representing a torque command to perform feedback control in such a manner that electric motor position signal θm and feedforward position command signal θff coincide with each other. Adder-subtractor 108 subtracts load acceleration feedback torque signal τacc obtained by multiplying load acceleration signal AL representing acceleration of the control target load by load acceleration feedback gain Kacc from torque command signal τs obtained by adding feedforward torque command signal τff and feedback torque command signal τfb, and adder-subtractor 108 outputs a result of the subtraction as torque command correction signal τin. Feedforward controller 1001 generates feedforward torque command signal τff so as to previously compensate an effect of the load acceleration feedback torque that is subtracted from torque command signal τs at the time of an acceleration-deceleration operation.

As a result, since an amount of reduction in the acceleration-deceleration torque due to the load acceleration feedback is previously compensated in the feedforward torque calculation by the feedforward control system, it is possible to enhance the vibration suppression effect due to the load acceleration feedback while maintaining the command follow-up performance. As a result, the vibration suppression effect is achieved due to the load acceleration feedback, and, at the same time, the command follow-up performance is maintained; therefore, both of the settling property and the vibration suppression can be satisfied.

Further, feedforward controller 1001 may generate feedforward torque command signal τff by multiplying feedforward acceleration command signal Aff calculated by second-order differentiating feedforward position command signal θff by an additional value of inertia of the electric motor, inertia of the control target load, and load acceleration feedback gain Kacc.

Second Exemplary Embodiment

Figure 4:
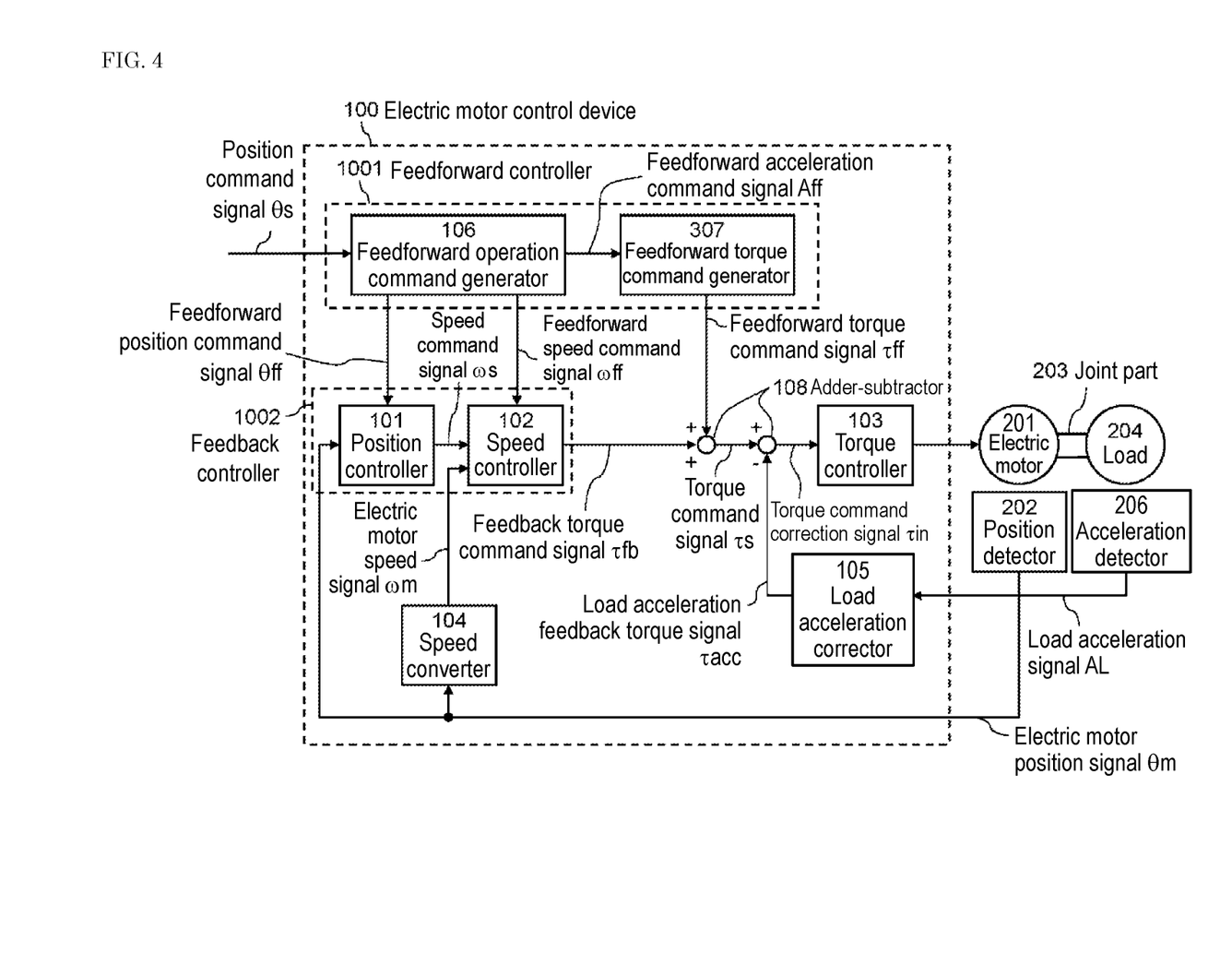
FIG. 4 is a diagram showing an example of a configuration of an electric motor control device in a second exemplary embodiment of the present invention.

FIG. 4 is a diagram showing an example of a configuration of an electric motor control device of a second exemplary embodiment of the present invention. FIG. 4 is different from FIG. 1 in acceleration detector 206 and feedforward torque command generator 307. Since functions of the other components than the above components are identical to the functions of the electric motor control device of the first exemplary embodiment of the present invention shown in FIG. 1, a redundant description will be omitted.

Acceleration detector 206 performs low-pass filtering or high-pass filtering on the acceleration of load 204 for the purpose of removing detected noise component, and outputs the filtered signal as load acceleration signal AL. When the filtering process is performed in acceleration detector 206, an apparent change in the inertia due to the load acceleration feedback is affected by the filtering process. Therefore, it is necessary to consider the filtering process by acceleration detector 206 during the calculation process of feedforward torque command signal τff by feedforward torque command generator 307.

Figure 5:
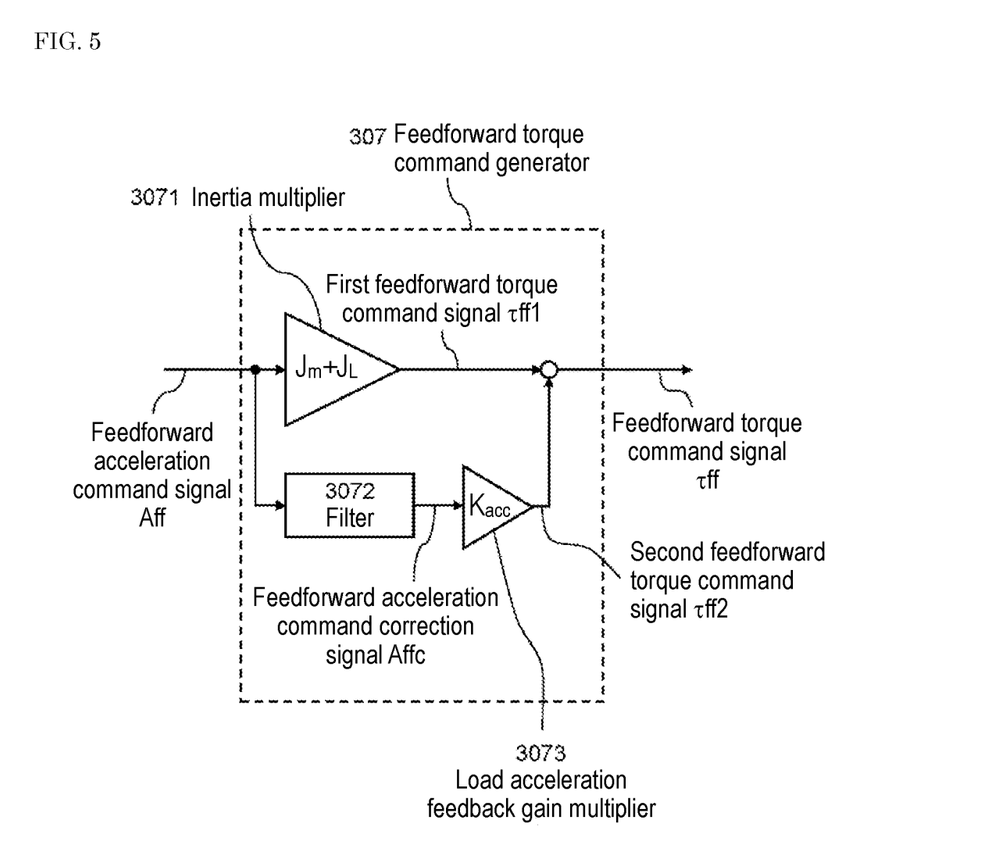
FIG. 5 is a diagram showing an example of a configuration of a feedforward torque command generator of the second exemplary embodiment of the present invention.

Next, a configuration of feedforward torque command generator 307 will be described. FIG. 5 is a diagram showing an example of a configuration of feedforward torque command generator 307 of the second exemplary embodiment of the present invention.

Feedforward torque command generator 307 internally has inertia multiplier 3071, filter 3072, and load acceleration feedback gain multiplier 3073.

Inertia multiplier 3071 receives feedforward acceleration signal Aff. Inertia multiplier 3071 uses an additional value of electric motor inertia Jm and load inertia JL as a weighting coefficient, and outputs a result obtained by multiplying feedforward acceleration signal Aff by the weighting coefficient as first feedforward torque command signal τff1.

Similarly, filter 3072 receives feedforward acceleration signal Aff. Filter 3072 performs on input feedforward acceleration signal Aff a filtering process equivalent to the filtering process performed on the acceleration of the load by acceleration detector 206, and outputs the filtered signal as feedforward acceleration command correction signal Affc.

Load acceleration feedback gain multiplier 3073 receives feedforward acceleration command correction signal Affc and outputs, as second feedforward torque command signal τff2, a value obtained by multiplying feedforward acceleration command correction signal Affc by load acceleration feedback gain Kacc.

An additional value of first feedforward torque command signal τff1 and second feedforward torque command signal τff2 is output from feedforward torque command generator 307 as feedforward torque command signal τff.

As described above, when feedforward torque command generator 307 calculates feedforward torque command τff from feedforward acceleration command signal Aff, the load acceleration feedback gain is considered in addition to the inertias of the electric motor and the load, and, in addition, the filtering process performed on the load acceleration is performed. With this configuration, the feedforward torque command is calculated in which the change, in the total inertia of the control target with respect to torque command signal τs, due to the load acceleration feedback is taken into consideration. As a result, the difference between the operation command and the operation of the electric motor at the time of an acceleration-deceleration operation is reduced, and it is possible to improve operation delay, overshoot, undershoot, or the like just before stopping.

As described above, in the present exemplary embodiment, an amount of the reduction, in the acceleration-deceleration torque, due to the load acceleration feedback is previously compensated in the feedforward torque calculation by the feedforward control system, taking into consideration the filtering process in the acceleration detector with respect to the load acceleration, so that the vibration suppression effect is enhanced due to the load acceleration feedback and, at the same time, the command follow-up performance is maintained. As a result, the vibration suppression effect is achieved due to the load acceleration feedback, and, at the same time, the command follow-up performance is maintained; therefore, both of the settling property and the vibration suppression can be satisfied.

As described above, in electric motor control device 100 of the present exemplary embodiment, adder-subtractor 108 generates torque command correction signal τin by subtracting from torque command signal τs the load acceleration feedback torque obtained by multiplying a signal obtained by performing a filtering process on load acceleration signal AL representing the acceleration of the control target load by load acceleration feedback gain Kacc. Further, feedforward controller 1001 generates feedforward torque command signal τff by adding the following two signals: a signal obtained by multiplying feedforward acceleration command signal Aff calculated by second-order differentiating feedforward position command signal θff by an additional value of the inertia of the electric motor and the inertia of the control target load; and a signal obtained by multiplying a signal obtained by performing a filtering process equivalent to the filtering process on feedforward acceleration command signal Aff by load acceleration feedback gain Kacc.

As a result, the difference between the operation command and the operation of the electric motor at the time of an acceleration-deceleration operation is reduced, and it is possible to improve operation delay, overshoot, undershoot, or the like just before stopping.

Further, in the present exemplary embodiment, the filtering process is performed on the load acceleration in the acceleration detector; however, the filtering process may be performed on the load acceleration in the electric motor control device.

As described above, the electric motor control device according to the present invention provides the vibration suppression effect due to the load acceleration feedback while maintaining the command follow-up performance. Therefore, it is possible to satisfy both of the settling property and the vibration suppression. By relaxing or removing a trade-off relation between a load acceleration feedback gain (acceleration feedback amount) and a command follow-up performance, it is possible to provide an electric motor control device in which a vibration suppression effect is enhanced by acceleration feedback from a load side and, at the same time, the command follow-up performance is maintained. Therefore, the present invention is suitable for applications such as an electric motor control device used for semiconductor manufacturing equipment, an electronic component mounter, and the like.

What is claimed is:

1. An electric motor control device that drives a control target load, the electric motor control device comprising:
   a feedforward controller that receives a position command signal to specify a target position of the control target load and outputs a feedforward position command signal representing a target position of the electric motor, a feedforward speed command signal representing a target speed of the electric motor, and a feedforward torque command signal representing a torque necessary for the electric motor to perform an operation indicated by the target position or the target speed;
   a feedback controller that receives the feedforward position command signal, the feedforward speed command signal, an electric motor position signal representing a position of the electric motor, an electric motor speed signal representing a speed of the electric motor, and outputs a feedback torque command signal representing a torque command to perform feedback control in such a manner that the electric motor position signal and the feedforward position command signal coincide with each other; and
   an adder-subtractor that subtracts a load acceleration feedback torque signal obtained by multiplying a load acceleration signal representing acceleration of the control target load by a load acceleration feedback gain from a torque command signal obtained by adding the feedforward torque command signal and the feedback torque command signal, and outputs a result of a subtraction as a torque command correction signal, wherein the feedforward controller generates the feedforward torque command signal so as to previously compensate an effect of the load acceleration feedback torque signal that is subtracted from the torque command signal at a time of an acceleration-deceleration operation.

2. The electric motor control device according to claim 1, wherein the feedforward controller generates the feedforward torque command signal by multiplying a feedforward acceleration command signal calculated by second-order differentiating the feedforward position command signal by an additional value of inertia of the electric motor, inertia of the control target load, and the load acceleration feedback gain.

3. The electric motor control device according to claim 1, wherein the adder-subtractor generates a torque command correction signal by subtracting from the torque command signal a load acceleration feedback torque signal obtained by multiplying a signal obtained by performing a filtering process on the load acceleration signal representing the acceleration of the control target load by the load acceleration feedback gain, and the feedforward controller generates the feedforward torque command signal by adding following two signals: a signal obtained by multiplying a feedforward acceleration command signal calculated by second-order differentiating the feedforward position command signal by an additional value of inertia of the electric motor and inertia of the control target load; and a signal obtained by multiplying a signal obtained by performing a filtering process equivalent to the filtering process on the feedforward acceleration command signal by the load acceleration feedback gain.

* * * * *